(12) United States Patent
Ma et al.

(10) Patent No.: US 12,305,259 B2
(45) Date of Patent: May 20, 2025

(54) COUPLING SYSTEM OF SUPERCRITICAL CARBON DIOXIDE CYCLE POWER GENERATION AND LITHIUM EXTRACTION FROM BRINE

(71) Applicant: BYD COMPANY LIMITED, Guangdong (CN)

(72) Inventors: Yuegeng Ma, Shenzhen (CN); Junlan Lian, Shenzhen (CN); Hongye Lin, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 539 days.

(21) Appl. No.: 17/869,309

(22) Filed: Jul. 20, 2022

(65) Prior Publication Data

US 2023/0065205 A1 Mar. 2, 2023

(30) Foreign Application Priority Data

Aug. 26, 2021 (CN) .......................... 202122035573.6

(51) Int. Cl.
*C22B 26/12* (2006.01)
*B01D 1/00* (2006.01)
(Continued)

(52) U.S. Cl.
CPC ............ *C22B 26/12* (2013.01); *B01D 1/0058* (2013.01); *B01D 61/027* (2013.01); *F25B 27/02* (2013.01);
(Continued)

(58) Field of Classification Search
CPC .. C22B 26/12; C22B 3/22; C22B 3/24; B01D 1/0058; B01D 61/027; B01D 2311/2626;
(Continued)

(56) References Cited

U.S. PATENT DOCUMENTS

| | | | |
|---|---|---|---|
| 2007/0089449 A1* | 4/2007 | Gurin ........................ | F01K 3/02 62/324.2 |
| 2016/0045841 A1* | 2/2016 | Kaplan .................... | C01B 32/05 429/49 |

(Continued)

FOREIGN PATENT DOCUMENTS

| | | |
|---|---|---|
| CN | 104481613 A | 4/2015 |
| CN | 108643981 A | 10/2018 |

(Continued)

*Primary Examiner* — Hoang M Nguyen

(57) ABSTRACT

This disclosure provides a system for coupling supercritical carbon dioxide cycle power generation and lithium extraction from brine. The system comprises an absorption heat pump unit, a supercritical carbon dioxide cycle power generation unit, and a unit for extracting lithium from brine. This system organically couples the exothermic characteristics of the supercritical carbon dioxide cycle system with the endothermic characteristics of the lithium extraction from brine system, and the waste heat is recycled in a cascade as the heat source in the lithium extraction from brine system, thereby effectively reducing the total energy consumption of power generation and lithium extraction and reduce the total equipment investment of the system, and significantly improving the efficiency of adsorption and lithium precipitation in the lithium extraction from brine system.

10 Claims, 1 Drawing Sheet

(51) Int. Cl.
  *B01D 61/02* (2006.01)
  *F25B 27/02* (2006.01)
  *F25B 30/04* (2006.01)

(52) U.S. Cl.
  CPC ...... *F25B 30/04* (2013.01); *B01D 2311/2626* (2013.01)

(58) Field of Classification Search
  CPC .... F25B 27/02; F25B 30/04; F25B 2309/061; F25B 2400/23; F25B 1/053; F25B 15/002; Y02P 20/129; Y02P 20/54
  See application file for complete search history.

(56) References Cited

U.S. PATENT DOCUMENTS

| | | | |
|---|---|---|---|
| 2020/0346137 A1* | 11/2020 | Palsdottir | B01J 39/08 |
| 2022/0231350 A1* | 7/2022 | Lipson | C22B 26/12 |

FOREIGN PATENT DOCUMENTS

| | | | |
|---|---|---|---|
| CN | 108661732 A | 10/2018 | |
| CN | 110344898 A | 10/2019 | |
| CN | 112483207 A | 3/2021 | |
| CN | 215444173 U | 1/2022 | |

* cited by examiner

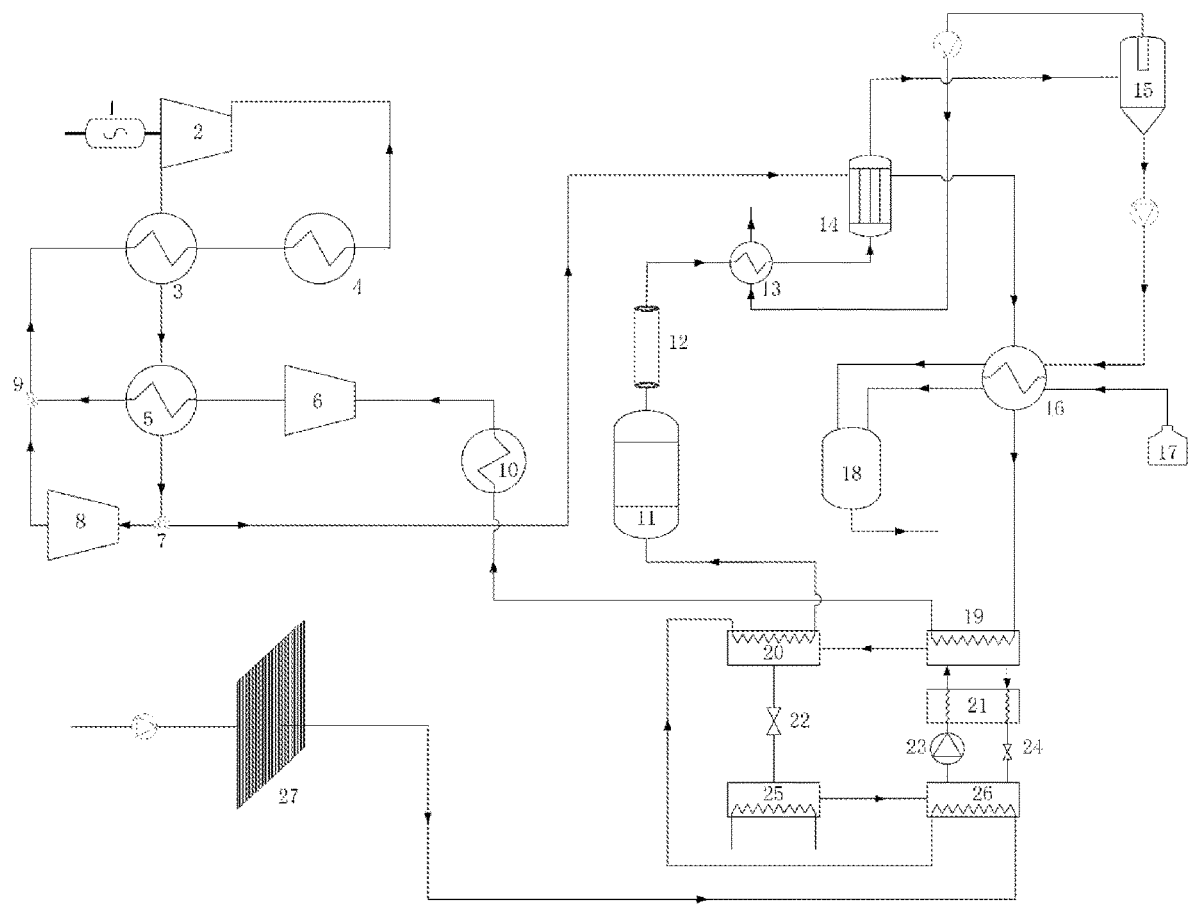

US 12,305,259 B2

COUPLING SYSTEM OF SUPERCRITICAL CARBON DIOXIDE CYCLE POWER GENERATION AND LITHIUM EXTRACTION FROM BRINE

CROSS-REFERENCE TO RELATED APPLICATIONS

This application is based on and claims priority to and benefits of Chinese Patent Application No. 202122035573.6, filed with the China National Intellectual Property Administration on Aug. 26, 2021. The entire content of the above-identified application is incorporated herein by reference.

FIELD

This disclosure relates to the field of lithium extraction from brine, and specifically, to a coupling system of supercritical carbon dioxide cycle power generation and lithium extraction from brine.

BACKGROUND

Supercritical carbon dioxide cycle has a great application prospect in power production such as coal-fired power generation, concentrated solar power generation, geothermal power generation, and waste heat recovery due to high thermal cycle efficiency, compact structure, and small footprint. The waste heat temperature of a cooler at a supercritical carbon dioxide cycle cold end reaches 100-200° C. In a supercritical carbon dioxide cycle power generation system that operates independently, it is necessary to cool the carbon dioxide working fluid to 32-40° C. before entering a compressor to ensure the high efficiency of the cycle power generation system. This cooling step not only wastes a lot of low-grade waste heat, but also requires an adequate supply of cooling water. The supply of industrial water is relatively limited and there is a strong demand for water saving and consumption reduction for dry and water-scarce Northwest China such as Qinghai. This contradicts the large consumption of cooling water in the supercritical carbon dioxide cycle power generation system.

According to another aspect, lithium and its compounds are widely used and of important strategic value for the development of national society. Salt lakes in Western China such as Qinghai are important potential production areas of lithium resources. The lithium resources in salt lakes account for more than 60% of the total amount in the country. However, the concentration of lithium in salt lakes in China is relatively low, and the process of extracting lithium salt from salt lake brines is complex and requires a large amount of low-grade thermal energy consumption. The low-grade thermal energy is generally supplied by steam, which also consumes a certain amount of industrial water. The lithium precipitation reaction requires a high temperature to maintain high yield and high lithium carbonate purity. The brine in an adsorption tower can help increase the adsorption capacity of an adsorbent at a high adsorption temperature, thereby increasing the adsorption yield. However, in a separate lithium extraction from brine system, a large amount of steam is required to increase and maintain the temperature of lithium precipitation and adsorption, which significantly increases the operating cost of the lithium extraction from brine process.

In the related art, the supercritical carbon dioxide cycle power generation system and the lithium extraction from brine system have drawbacks such as large consumption of industrial water and steam, which significantly increases the operating cost of the power generation system and the lithium extraction from brine system. The solution of increasing the working temperature of the lithium precipitation reaction section and adsorption section in the lithium extraction from brine system has large energy and steam consumption, which is not technically competitive due to the high input cost of separately operating the lithium extraction from brine system. The direct discharge of waste heat from the cold end of the supercritical carbon dioxide power generation system also wastes a large amount of thermal energy resources and consumes a large amount of cooling water.

SUMMARY

An objective of this disclosure is to provide a coupling system of supercritical carbon dioxide cycle power generation and lithium extraction from brine. The system can effectively reduce the total energy consumption of power generation and lithium extraction, reduce the total equipment investment of the system, and significantly improve the efficiency of adsorption and lithium precipitation in the lithium extraction from brine system.

To achieve the foregoing objective, this disclosure provides a coupling system of supercritical carbon dioxide cycle power generation and lithium extraction from brine, including an absorption heat pump unit, a supercritical carbon dioxide cycle power generation unit, and a unit for extracting lithium from brine, where the absorption heat pump unit includes a driving heat source inlet, a driving heat source outlet, a to-be-heated material inlet, and a heated material outlet; the unit for extracting lithium from brine includes a brine inlet and a lithium extraction device, and the lithium extraction device comprises a raw material inlet, a heating medium inlet, and a heating medium outlet; the brine inlet is in communication with the to-be-heated material inlet of the absorption heat pump unit, and the heated material outlet is in communication with the raw material inlet of the lithium extraction device; the supercritical carbon dioxide cycle power generation unit includes a carbon dioxide cycle cold end outlet and a carbon dioxide cycle cold end inlet; and the carbon dioxide cycle cold end outlet is in communication with the heating medium inlet of the unit for extracting lithium from brine and/or the driving heat source inlet of the absorption heat pump unit, and the carbon dioxide cycle cold end inlet of the supercritical carbon dioxide cycle power generation unit is in communication with the heating medium outlet of the unit for extracting lithium from brine and/or the driving heat source outlet.

Through the foregoing technical solution, the coupling system integrates the supercritical carbon dioxide cycle power generation system and the lithium extraction from brine system, which does not directly release the waste heat carried by carbon dioxide working fluid at the supercritical carbon dioxide cycle cold end in the cooler, but recycles the waste heat in a cascade as the heat source in the lithium extraction from brine system. This system achieves "quality in exchange for quantity" of part of the waste heat by using the absorption heat pump based on the principle of "temperature zone matching, energy cascade utilization", thereby organically coupling the exothermic characteristics of the supercritical carbon dioxide cycle system with the endothermic characteristics of the lithium extraction from brine system. Compared with a supercritical carbon dioxide cycle system and a salt lake lithium extraction system that are operated separately, the coupling system provided by this disclosure can effectively reduce the total energy consumption of power generation and lithium extraction, reduce the total equipment investment of the system, and significantly improve the efficiency of adsorption and lithium precipitation in the lithium extraction from brine system.

Other features and advantages of this disclosure will be described in detail in the following detailed description part.

BRIEF DESCRIPTION OF THE DRAWINGS

The accompanying drawings are intended to provide further understanding of this disclosure and constitute a part of this specification. The accompanying drawings and the embodiments below are used together for explaining this disclosure rather than constituting a limitation to this disclosure. In the accompanying drawings:

FIG. 1 is a process flowchart of an embodiment of a coupling system of supercritical carbon dioxide cycle power generation and lithium extraction from brine according to this disclosure.

DESCRIPTION OF DRAWINGS

1. Electric generator, 2. Turbine, 3. High-temperature regenerator, 4. Third heater, 5. Low-temperature regenerator, 6. First compressor, 7. Three-way diverting control valve, 8. Second compressor, 9. Three-way mixing control valve, 10. Cooler, 11. Adsorption tower, 12. Nanofiltration membrane section, 13. Preheater, 14. First heater, 15. Gas-liquid separator, 16. Second heater, 17. Sodium carbonate solution tank, 18. Lithium precipitation reactor, 19. Generator, 20. Condenser, 21. Solution exchanger, 22. Steam valve, 23. Solution pump, 24. Solution valve, 25. Absorber, 26. Desorber, and 27. Strainer.

DETAILED DESCRIPTION

Embodiments of this disclosure are described in detail below. It should be understood that the embodiments described herein are merely used for describing and explaining this disclosure, and are not intended to limit this disclosure.

As shown in FIG. 1, this disclosure provides a coupling system of supercritical carbon dioxide cycle power generation and lithium extraction from brine, which includes an absorption heat pump unit, a supercritical carbon dioxide cycle power generation unit, and a unit for extracting lithium from brine, where the absorption heat pump unit includes a driving heat source inlet, a driving heat source outlet, a to-be-heated material inlet, and a heated material outlet. The unit for extracting lithium from brine includes a brine inlet and a lithium extraction device, and the lithium extraction device includes a raw material inlet, a heating medium inlet, and a heating medium outlet. The brine inlet is in communication with the to-be-heated material inlet of the absorption heat pump unit, and the heated material outlet is in communication with the raw material inlet of the lithium extraction device. The supercritical carbon dioxide cycle power generation unit includes a carbon dioxide cycle cold end outlet and a carbon dioxide cycle cold end inlet, and the carbon dioxide cycle cold end outlet is in communication with the heating medium inlet of the unit for extracting lithium from brine and/or the driving heat source inlet of the absorption heat pump unit. The carbon dioxide cycle cold end inlet of the supercritical carbon dioxide cycle power generation unit is in communication with the heating medium outlet of the unit for extracting lithium from brine and/or the driving heat source outlet.

The inventor of this disclosure found that the waste heat exothermic temperature section at the cold end of the existing supercritical carbon dioxide cycle power generation system is basically matched with the heating medium endothermic temperature section of the lithium extraction from brine system, for example, may be used as a heating medium for increasing and maintaining the temperature during lithium precipitation and adsorption in the lithium extraction from brine system. The coupling system provided by this disclosure couples the supercritical carbon dioxide cycle power generation unit with the unit for extracting lithium from brine through the absorption heat pump unit, which does not directly release the waste heat carried by carbon dioxide working fluid at the supercritical carbon dioxide cycle cold end in the cooler, but recycles the waste heat in a cascade as the heat source in the lithium extraction from brine system. This system achieves "quality in exchange for quantity" of part of the waste heat by using the absorption heat pump based on the principle of "temperature zone matching, energy cascade utilization", thereby organically coupling the exothermic characteristics of the supercritical carbon dioxide cycle system with the endothermic characteristics of the lithium extraction from brine system. Compared with a supercritical carbon dioxide cycle system and a salt lake lithium extraction system that are operated separately, the novel coupling system provided by this disclosure can effectively reduce the total energy consumption of power generation and lithium extraction, reduce the total equipment investment of the system, and significantly improve the efficiency of the lithium extraction from brine system.

According to this disclosure, the carbon dioxide cycle cold end outlet of the supercritical carbon dioxide cycle power generation unit, the heating medium inlet of the unit for extracting lithium from brine, and the driving heat source inlet of the absorption heat pump unit may be connected in series, in parallel, or in series and parallel. The heating medium inlet of the unit for extracting lithium from brine is provided from a device that needs to consume heat in the unit for extracting lithium from brine, for example, including one or more of a heating medium inlet from the lithium precipitation reaction step, a heating medium inlet from the adsorption step, and a heating medium inlet from the evaporation concentration step.

In an embodiment of this disclosure, the carbon dioxide cycle cold end outlet of the supercritical carbon dioxide cycle power generation unit is in sequential communication with the heating medium inlet of the unit for extracting lithium from brine and the driving heat source inlet of the absorption heat pump unit. According to an embodiment of this disclosure, the carbon dioxide cycle cold end outlet is in communication with the heating medium inlet of the unit for extracting lithium from brine, the heating medium outlet of the unit for extracting lithium from brine is in communication with the driving heat source inlet of the absorption heat pump unit, and the driving heat source outlet is in communication with the carbon dioxide cycle cold end inlet of the supercritical carbon dioxide cycle power generation unit.

In another embodiment of this disclosure, the carbon dioxide cycle cold end outlet of the supercritical carbon dioxide cycle power generation unit is in sequential communication with the driving heat source inlet of the absorption heat pump unit and the heating medium inlet of the unit for extracting lithium from brine. According to an embodiment of this disclosure, the carbon dioxide cycle cold end outlet is in communication with the driving heat source inlet of the absorption heat pump unit, the driving heat source outlet is in communication with the heating medium inlet of the unit for extracting lithium from brine, and the heating medium outlet of the unit for extracting lithium from brine is in communication with the carbon dioxide cycle cold end inlet of the supercritical carbon dioxide cycle power generation unit.

In another embodiment of this disclosure, the carbon dioxide cycle cold end outlet is in communication with the driving heat source inlet of the absorption heat pump unit and the heating medium inlet of the unit for extracting lithium from brine separately, and the driving heat source outlet and the heating medium outlet of the unit for extracting lithium from brine are separately in communication with the carbon dioxide cycle cold end inlet of the supercritical carbon dioxide cycle power generation unit, that is, the driving heat source of the absorption heat pump unit and the heating medium side of the unit for extracting lithium from brine are connected in parallel.

The inventor of this disclosure further found that the waste heat carried by carbon dioxide working fluid at the cold end of the supercritical carbon dioxide cycle power generation unit can be recycled in a cascade as the heat source during evaporation concentration and lithium precipitation in the lithium extraction from brine system. In an embodiment of this disclosure, the lithium extraction device includes an evaporation concentration device and a lithium precipitation reaction device. The carbon dioxide cycle cold end outlet is in communication with a heating medium inlet of the evaporation concentration device, and a heating medium outlet of the evaporation concentration device is in communication with a heating medium inlet of the lithium precipitation reaction device, so that the carbon dioxide working fluid at the cold end of the supercritical carbon dioxide cycle power generation unit is used as the heating medium in the evaporation concentration device and the heating medium in the lithium precipitation reaction device sequentially. Further, a heating medium outlet of the lithium precipitation reaction device is in communication with the driving heat source inlet of the absorption heat pump unit, to further recycle the waste heat from the carbon dioxide working fluid at the cold end.

In an embodiment, for example, the evaporation concentration device is a single-stage evaporation concentration device or a multi-stage evaporation concentration device. The evaporation concentration device includes a first heater 14 and a gas-liquid separator 15, and the lithium precipitation reaction device includes a second heater 16 and a lithium precipitation reactor 18. Further, an endothermic side outlet of the first heater 14 is in communication with an inlet of the gas-liquid separator 15, a liquid phase outlet of the gas-liquid separator 15 in communication with an endothermic side inlet of the second heater 16, and an endothermic side outlet of the second heater 16 is in communication with a raw material inlet of the lithium precipitation reactor 18. The carbon dioxide cycle cold end outlet is in communication with an exothermic side inlet of the first heater 14, and an exothermic side outlet of the first heater 14 is in communication with an exothermic side inlet of the second heater 16, so that the carbon dioxide working fluid at the cold end of the supercritical carbon dioxide cycle power generation unit enters the first heater 14 of the evaporation concentration device and the second heater 16 of the lithium precipitation reaction device sequentially as the heating medium. Furthermore, an exothermic side outlet of the second heater 16 is in communication with the driving heat source inlet of the absorption heat pump unit.

To improve the lithium extraction effect of the unit for extracting lithium from brine, the unit for extracting lithium from brine further includes an adsorption device and a membrane separation device that are in sequential communication. The brine inlet of the unit for extracting lithium from brine may be in communication with a to-be-adsorbed material inlet of the adsorption device, and a lithium-rich permeate outlet of the membrane separation device is in communication with an endothermic side inlet of the first heater 14, so that the brine raw material entering the unit for extracting lithium from brine is sequentially subjected to adsorption to remove impurities and membrane separation to remove divalent ions before entering the evaporation concentration device. The adsorption device includes, for example, an adsorption tower 11. An adsorbent is a conventional type in the art. The membrane separation device includes, for example, a nanofiltration membrane section 12.

In an embodiment, to further improve the energy efficiency of the device, the lithium extraction device further includes a preheater 13. An endothermic side inlet of the preheater 13 is in communication with the lithium-rich permeate outlet of the membrane separation device, and an endothermic side outlet of the preheater is in communication with the endothermic side inlet of the first heater 14. A gas phase outlet of the gas-liquid separator 15 is in communication with an exothermic side inlet of the preheater 13, to preheat the brine that will enter the evaporation concentration device with the heat of the steam separated from the gas-liquid separator 15.

In an embodiment, the lithium precipitation reaction device further includes a sodium carbonate solution inlet, and the sodium carbonate solution inlet is in communication with the endothermic side inlet of the second heater 16, so that the sodium carbonate solution enters the lithium precipitation reactor 18 for reaction after preheated in the second heater 16. The sodium carbonate solution inlet may be in communication with a sodium carbonate solution tank 17.

In an embodiment, the unit for extracting lithium from brine further includes a strainer 27, and the strainer 27 is disposed between the brine inlet and the to-be-heated material inlet of the absorption heat pump unit.

In other embodiments of this disclosure, the unit for extracting lithium from brine may further include a pretreatment device or a post-treatment device for removing boron and iron.

According to an embodiment of this disclosure, the absorption heat pump unit includes a first type of absorption heat pump, and the first type of absorption heat pump includes a generator 19, a condenser 20, an absorber 25, and a desorber 26, and an exothermic side inlet of the generator 19 forms the driving heat source inlet to be in communication with the heating medium outlet of the unit for extracting lithium from brine. According to an embodiment, the lithium extraction device of the unit for extracting lithium from brine includes the evaporation concentration device and the lithium precipitation reaction device, the exothermic side inlet of the generator 19 is in communication with the heating medium outlet of the lithium precipitation reaction device.

Further, an exothermic side outlet of the generator 19 forms the driving heat source outlet to be in communication with the carbon dioxide cycle cold end inlet. An endothermic side inlet of the desorber 26 forms the to-be-heated material inlet to be in communication with the brine inlet, an endothermic side outlet of the desorber 26 is in communication with an endothermic side inlet of the condenser 20 of the absorption heat pump unit, and an endothermic side outlet of the condenser 20 forms the heated material outlet to be in communication with the raw material inlet of the lithium extraction device. In this embodiment, the carbon dioxide working fluid at the cold end of the supercritical carbon dioxide cycle power generation unit is used as the driving heat source of the absorption heat pump unit after providing heat for lithium extraction from brine, and the brine raw material is preheated through the absorption heat pump unit before entering the unit for extracting lithium from brine, so as to further recycle the waste heat from the carbon dioxide working fluid at the cold end.

In an embodiment, the first type of absorption heat pump may be a water and lithium bromide heat bump and/or an ammonia and water heat pump. The first type of absorption heat pump may further include a solution exchanger 21, a steam valve 22, a solution pump 23, and a solution valve 24. The first type of absorption heat pump may be a single-stage absorption heat pump or a multi-stage absorption heat pump.

According to an embodiment of this disclosure, the supercritical carbon dioxide cycle power generation unit is a recompression supercritical carbon dioxide cycle power generation unit. In other embodiments of this disclosure, the supercritical carbon dioxide cycle power generation unit may be a simple regenerative cycle supercritical carbon dioxide cycle power generation unit or a partial cooling cycle supercritical carbon dioxide cycle power generation unit.

In an embodiment, the supercritical carbon dioxide cycle power generation unit further includes an electric generator 1, a turbine 2, a high-temperature regenerator 3, and a low-temperature regenerator 5. The electric generator 1 is coaxially connected to the turbine 2. An outlet of the turbine 2, an exothermic side of the high-temperature regenerator 3, and an exothermic side inlet of the low-temperature regenerator are in sequential communication. An exothermic side outlet of the low-temperature regenerator 5 is in communication with the carbon dioxide cycle cold end outlet. So that the carbon dioxide working fluid from the outlet of the turbine 2 passes through the high-temperature regenerator 3 and the low-temperature regenerator 5 to recycle heat, and the carbon dioxide working fluid with the recycled heat is introduced out of the supercritical carbon dioxide cycle power generation unit from the carbon dioxide cycle cold end outlet as the carbon dioxide working fluid at the cold end to further recycle heat therein.

In an embodiment, the supercritical carbon dioxide cycle power generation unit further includes a cooler 10, a first compressor 6, and a third heater 4. The carbon dioxide cycle cold end inlet, an exothermic side of the cooler 10, and an inlet of the first compressor 6 are in sequential communication. An outlet of the first compressor 6, an endothermic side of the low-temperature regenerator 5, an endothermic side of the high-temperature regenerator 3. An endothermic side inlet of the third heater 4 are in sequential communication, and an endothermic side outlet of the third heater 4 is in communication with an inlet of the turbine 2. In an embodiment, the carbon dioxide working fluid after waste heat recycling through the unit for extracting lithium from brine and the absorption heat pump unit returns to the supercritical carbon dioxide cycle power generation unit through the carbon dioxide cycle cold end inlet, is cooled by the cooler 10 and compressed by the first compressor 6, is heated sequentially through the low-temperature regenerator 5, the high-temperature regenerator 3 and the third heater 4, and enters the turbine 2 from the inlet, to complete the supercritical carbon dioxide power generation cycle. A cooling medium in the cooler is, for example, cooling water.

In an embodiment of this disclosure, the supercritical carbon dioxide cycle power generation unit further includes a three-way diverting control valve 7, a three-way mixing control valve 9, and a second compressor 8. An inlet of the three-way diverting control valve 7 is in communication with the exothermic side outlet of the low-temperature regenerator 5. A first outlet of the three-way diverting control valve 7 forms the carbon dioxide cycle cold end outlet, and a second outlet of the three-way diverting control valve 7 is in communication with an inlet of the second compressor 8. An outlet of the second compressor 8 is in communication with a first inlet of the three-way mixing control valve 9, a second inlet of the three-way mixing control valve 9 is in communication with an endothermic side outlet of the low-temperature regenerator 5. An outlet of the three-way mixing control valve 9 is in communication with an endothermic side inlet of the high-temperature regenerator 3. In an embodiment, the degree of opening of the regulatable three-way diverting control valve 7 may be regulated according to the energy supply requirement of the unit for extracting lithium from brine to regulate the carbon dioxide flow used in the unit for extracting lithium from brine. Further, the carbon dioxide flow used in the lithium extraction from brine system may be regulated by regulating the degree of opening of the three-way mixing control valve 9, so as to regulate the energy supply of the lithium extraction from brine system.

To further make the thermal energy of the supercritical carbon dioxide cycle power generation unit match the thermal energy of the unit for extracting lithium from brine, in an embodiment, the net power of the supercritical carbon dioxide cycle power generation unit is 2-5 kW in response to the production of 1 ton of lithium carbonate from the lithium extraction from brine.

In an embodiment of this disclosure, as shown in FIG. 1, the supercritical carbon dioxide cycle power generation unit includes an electric generator 1. The electric generator 1 is coaxially connected to a turbine 2, an outlet of the turbine 2 is connected to an exothermic side inlet of a high-temperature regenerator 3, an exothermic side outlet of the high-temperature regenerator 3 is connected to an exothermic side inlet of a low-temperature regenerator 5, an exothermic side outlet of the low-temperature regenerator 5 is connected to a three-way diverting control valve 7 with two outlets, a second outlet thereof is connected to a second compressor 8, and an outlet of the second compressor 8 is connected to a three-way mixing control valve 9. A first outlet of the three-way diverting control valve 7 as a carbon dioxide cycle cold end outlet is connected to an exothermic side inlet of a first heater 14, an exothermic side outlet of the first heater 14 is connected to an exothermic side inlet of a second heater 16, an exothermic side outlet of the second heater 16 is connected to an exothermic side inlet of a generator 19 of an absorption heat pump, an exothermic side outlet of the generator 19 is connected to an exothermic side inlet of a cooler 10 as a carbon dioxide cycle cold end inlet, an exothermic side outlet of the cooler 10 is connected to an inlet of a first compressor 6, an outlet of the first compressor 6 is connected to an endothermic side inlet of the low-temperature regenerator 5, and a working fluid from an endothermic side outlet of the low-temperature regenerator 5 enters the three-way mixing control valve 9 to rejoin working fluids from the three-way diverting control valve 7 and the second compressor 8. The rejoined working fluid enters the high-temperature regenerator 3 from an endothermic side inlet, an endothermic side outlet of the high-temperature regenerator 3 is connected to an endothermic side inlet of a third heater 4, and an outlet of the third heater 4 is connected to an inlet of the turbine 2, to complete the loop of the supercritical carbon dioxide cycle power generation subsystem. The carbon dioxide working fluid at an inlet of the second compressor 8 works under a pressure of 7.5-8.5 MPa and at a temperature of 32-40° C. to ensure that the carbon dioxide working fluid works under the supercritical condition.

The unit for extracting lithium from brine includes a strainer 27. The brine raw material is first filtered by the strainer, the brine permeate from the strainer enters a desorber 26 of the absorption heat pump unit from an endothermic side inlet, the brine permeate from an endothermic side outlet of the desorber 26 enters a condenser 20 from an endothermic side inlet, the brine permeate from an endothermic side outlet of the condenser 20 enters an adsorption tower 11 from a brine inlet for adsorption, and then an adsorbent is washed with water to obtain a desorption liquid. The desorption liquid enters a nanofiltration membrane section 12 from the adsorption tower 11 for filtration, the filtered liquid from the nanofiltration membrane section 12 enters a preheater 13 from an endothermic side inlet for preheating, the preheated liquid from an endothermic side outlet of the preheater 13 enters the first heater 14 from an endothermic side inlet, and the heated liquid from an endothermic side outlet of the first heater 14 enters a gas-liquid separator 15 from an inlet to be separated into steam and concentrated brine. The steam from an outlet above the gas-liquid separator is pumped as a heat source to an exothermic side inlet of the preheater 13 to preheat brine therein. The concentrated brine from an outlet below the gas-liquid separator is pumped to an endothermic side inlet of the second heater 16 to be preheated together with the sodium carbonate solution from a sodium carbonate solution tank 17 to 70-90° C. in the second heater 16. The brine and the sodium carbonate solution from an endothermic side outlet of the second heater 16 enter a lithium precipitation reactor 18 for lithium precipitation reaction.

The coupling system of supercritical carbon dioxide cycle power generation and lithium extraction from brine of this disclosure has the following advantages:

1) Compared with a separate supercritical carbon dioxide cycle, the consumption of cooling water used in the supercritical carbon dioxide cycle power generation in the coupling cycle is reduced by 50-80%.

2) The consumption of steam originally required for the evaporation concentration of the brine is completely avoided, thereby avoiding the energy consumption and equipment investment for steam production.

3) The temperature of the solution entering the lithium precipitation reactor is increased by 20-40° C., which can increase the yield from lithium precipitation by 5-20%, and can increase the purity of the obtained lithium carbonate by 3-7%.

4) The temperature of the brine in the adsorption section before entering the adsorption tower is increased by 40-50° C., which can increase the adsorption capacity of the adsorbent by 60-100%, and can increase the yield per unit time of the qualified liquid rich in lithium carbonate by 50-120%.

The total amount of available heat energy is increased through "quality in exchange for quantity" by using the absorption heat pump unit in the coupling system, thereby better achieving the energy level matching in the process of heating the brine with the carbon dioxide working fluid. The supercritical carbon dioxide working fluid from the carbon dioxide cycle cold end outlet works at a temperature of about 180-220° C., which is suitable for use as the heating medium for increasing and maintaining the temperature during lithium precipitation and adsorption in the lithium extraction from brine system. After heat exchange in the lithium extraction from brine system, the supercritical carbon dioxide working fluid in the generator 19 releases heat from 120-150° C. to 50-70° C. , and the temperature of the brine through the desorber 26 and the condenser 20 is increased by 30-60° C. The coefficient of performance (COP) of the absorption heat pump unit is between 1.8 and 2.5. The operation of the system is flexible. The heat supply of the absorption heat pump unit can be adjusted with the cycle flow of the absorption heat pump unit working fluid.

The embodiments of this disclosure are described in detail above, but this disclosure is not limited to the details in the foregoing embodiments. Various simple variations may be made to the technical solutions of this disclosure within the scope of the technical idea of this disclosure, and such simple variations shall all fall within the protection scope of this disclosure.

It should be additionally noted that, the technical features described in the foregoing embodiments may be combined in any proper manner without conflict. To avoid unnecessary repetition, various possible combination manners are not described in this disclosure.

In addition, different embodiments of this disclosure may also be arbitrarily combined without departing from the idea of this disclosure, and these combinations shall still be regarded as content disclosed in this disclosure.

What is claimed is:

1. A system for coupling supercritical carbon dioxide cycle power generation and lithium extraction from brine, the system comprising an absorption heat pump unit, a supercritical carbon dioxide cycle power generation unit, and a unit for extracting lithium from brine, wherein the absorption heat pump unit comprises a driving heat source inlet, a driving heat source outlet, a to-be-heated material inlet, and a heated material outlet;

the unit for extracting lithium from brine comprises a brine inlet and a lithium extraction device, and the lithium extraction device comprises a raw material inlet, a heating medium inlet, and a heating medium outlet; the brine inlet is in communication with the to-be-heated material inlet of the absorption heat pump unit, and the heated material outlet of the absorption heat pump unit is in communication with the raw material inlet of the lithium extraction device;

the supercritical carbon dioxide cycle power generation unit comprises a carbon dioxide cycle cold end outlet and a carbon dioxide cycle cold end inlet; and the carbon dioxide cycle cold end outlet is in communication with the heating medium inlet of the unit for extracting lithium from brine and/or the driving heat source inlet of the absorption heat pump unit, and the carbon dioxide cycle cold end inlet of the supercritical carbon dioxide cycle power generation unit is in communication with the heating medium outlet of the unit for extracting lithium from brine and/or the driving heat source outlet of the absorption heat pump unit.

2. The system according to claim 1, wherein the lithium extraction device comprises an evaporation concentration device and a lithium precipitation reaction device; and the carbon dioxide cycle cold end outlet of the supercritical carbon dioxide cycle power generation unit is in communication with a heating medium inlet of the evaporation concentration device, a heating medium outlet of the evaporation concentration device is in communication with a heating medium inlet of the lithium precipitation reaction device, and a heating medium outlet of the lithium precipitation reaction device is in communication with the driving heat source inlet of the absorption heat pump unit.

3. The system according to claim 2, wherein the evaporation concentration device comprises a first heater and a gas-liquid separator, the lithium precipitation reaction device comprises a second heater and a lithium precipitation reactor, the unit for extracting lithium from brine further comprises an adsorption device and a membrane separation device that are in sequential communication;

a lithium-rich permeate outlet of the membrane separation device is in communication with an endothermic side inlet of the first heater, an endothermic side outlet of the first heater is in communication with an inlet of the gas-liquid separator, a liquid phase outlet of the gas-liquid separator is in communication with an endothermic side inlet of the second heater, and an endothermic side outlet of the second heater is in communication with a raw material inlet of the lithium precipitation reactor, the carbon dioxide cycle cold end outlet of the supercritical carbon dioxide cycle power generation unit is in communication with an exothermic side inlet of the first heater, an exothermic side outlet of the first heater is in communication with an exothermic side inlet of the second heater, and an exothermic side outlet of the second heater is in communication with the driving heat source inlet of the absorption heat pump unit.

4. The system according to claim 3, wherein the lithium extraction device further comprises a preheater;

an endothermic side inlet of the preheater is in communication with the lithium-rich permeate outlet of the membrane separation device; and an endothermic side outlet of the preheater is in communication with the endothermic side inlet of the first heater; and a gas phase outlet of the gas-liquid separator is in communication with an exothermic side inlet of the preheater.

5. The system according to claim 3, wherein the lithium precipitation reaction device further comprises a sodium carbonate solution inlet, and the sodium carbonate solution inlet is in communication with the endothermic side inlet of the second heater.

6. The system according to claim 2, wherein the unit for extracting lithium from brine further comprises a strainer, and the strainer is disposed between the brine inlet of the unit for extracting lithium from brine and the to-be-heated material inlet of the absorption heat pump unit.

7. The system according to claim 1, wherein the absorption heat pump unit comprises a generator, a condenser, an absorber, and a desorber;

an exothermic side inlet of the generator forms the driving heat source inlet in communication with the heating medium outlet of the unit for extracting lithium from brine; and an exothermic side outlet of the generator forms the driving heat source outlet in communication with the carbon dioxide cycle cold end inlet of the supercritical carbon dioxide cycle power generation unit; and an endothermic side inlet of the desorber forms the to-be-heated material inlet in communication with the brine of inlet the unit for extracting lithium from brine, an endothermic side outlet of the desorber is in communication with an endothermic side inlet of the condenser of the absorption heat pump unit, and an endothermic side outlet of the condenser forms the heated material outlet of the absorption heat pump unit in communication with the raw material inlet of the lithium extraction device.

8. The system according to claim 1, wherein the supercritical carbon dioxide cycle power generation unit further comprises an electric generator, a turbine, a high-temperature regenerator, and a low-temperature regenerator, the electric generator is coaxially connected to the turbine, an outlet of the turbine, an exothermic side of the high-temperature regenerator, and an exothermic side inlet of the low-temperature regenerator are in sequential communication, and an exothermic side outlet of the low-temperature regenerator is in communication with the carbon dioxide cycle cold end outlet of the supercritical carbon dioxide cycle power generation unit.

9. The system according to claim 8, wherein the supercritical carbon dioxide cycle power generation unit further comprises a cooler, a first compressor, and a third heater, the carbon dioxide cycle cold end inlet of the supercritical carbon dioxide cycle power generation unit, an exothermic side of the cooler, and an inlet of the first compressor are in sequential communication, an outlet of the first compressor, an endothermic side of the low-temperature regenerator, an endothermic side of the high-temperature regenerator, and an endothermic side inlet of the third heater are in sequential communication, and an endothermic side outlet of the third heater is in communication with an inlet of the turbine.

10. The system according to claim 8, wherein the supercritical carbon dioxide cycle power generation unit further comprises a three-way diverting control valve, a three-way mixing control valve, and a second compressor, an inlet of the three-way diverting control valve is in communication with the exothermic side outlet of the low-temperature regenerator, a first outlet of the three-way diverting control valve forms the carbon dioxide cycle cold end outlet of the supercritical carbon dioxide cycle power generation unit, a second outlet of the three-way diverting control valve is in communication with an inlet of the second compressor, an outlet of the second compressor is in communication with a first inlet of the three-way mixing control valve, a second inlet of the three-way mixing control valve is in communication with an endothermic side outlet of the low-temperature regenerator, and an outlet of the three-way mixing control valve is in communication with an endothermic side inlet of the high-temperature regenerator.

* * * * *